United States Patent [19]

Sbaragli et al.

[11] Patent Number: 4,865,383

[45] Date of Patent: Sep. 12, 1989

[54] FASTENING ASSEMBLY FOR VEHICLE SEAT UPHOLSTERY

[75] Inventors: Silvano Sbaragli, Vinovo; Carlo Vitale, Nichelino, both of Italy

[73] Assignee: Fiat Auto S.p.A., Turin, Italy

[21] Appl. No.: 155,760

[22] Filed: Feb. 16, 1988

[30] Foreign Application Priority Data

Feb. 20, 1987 [IT] Italy ............................. 53048/87[U]

[51] Int. Cl.[4] ............................................. A47C 27/00

[52] U.S. Cl. ......................................... 297/218; 5/402; 297/452

[58] Field of Search ............... 5/402, 409; 160/390 A; 297/218, 452, DIG. 2

[56] References Cited

U.S. PATENT DOCUMENTS

| | | | |
|---|---|---|---|
| 2,222,052 | 11/1940 | Vanderploeg | 5/402 |
| 3,233,253 | 2/1966 | Cauvin | 5/402 |
| 3,630,572 | 12/1971 | Homier | 297/218 |
| 3,794,378 | 2/1974 | Haslam et al. | 297/219 |
| 3,981,534 | 9/1976 | Wilton | 5/402 |
| 4,549,334 | 10/1985 | Miller | 160/398 X |

FOREIGN PATENT DOCUMENTS

| | | |
|---|---|---|
| 2030094 | 4/1971 | Fed. Rep. of Germany . |
| 2046588 | 11/1980 | United Kingdom . |

*Primary Examiner*—James T. McCall
*Attorney, Agent, or Firm*—Shlesinger & Myers

[57] ABSTRACT

Assembly for fastening upholstery to the padding of a vehicle seat, which assembly comprises a bar sunk inside the padding, and a flexible plastic section stitched to the upholstery and secured to the bar by means of a number of metal fasteners.

7 Claims, 1 Drawing Sheet

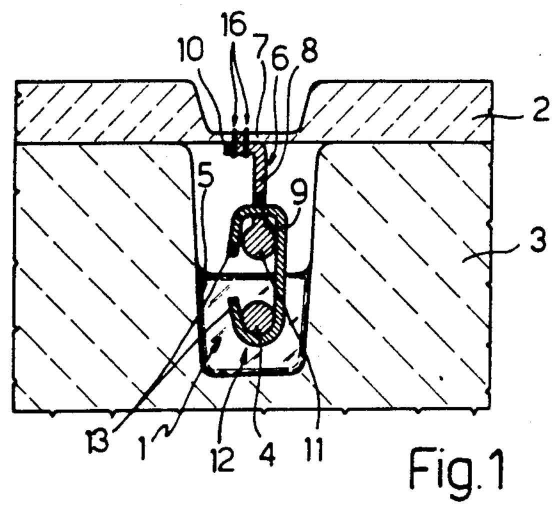
Fig.1
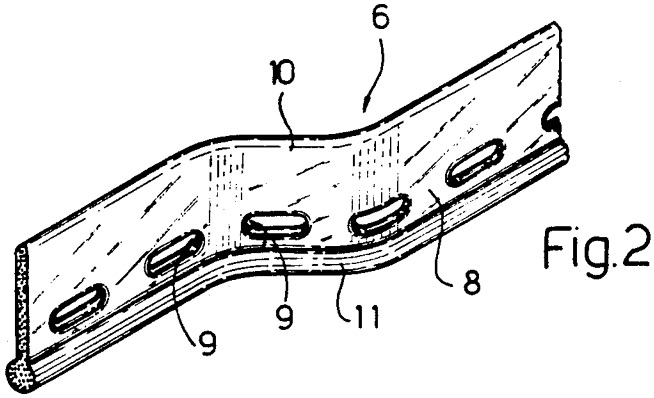
Fig.2
Fig.3
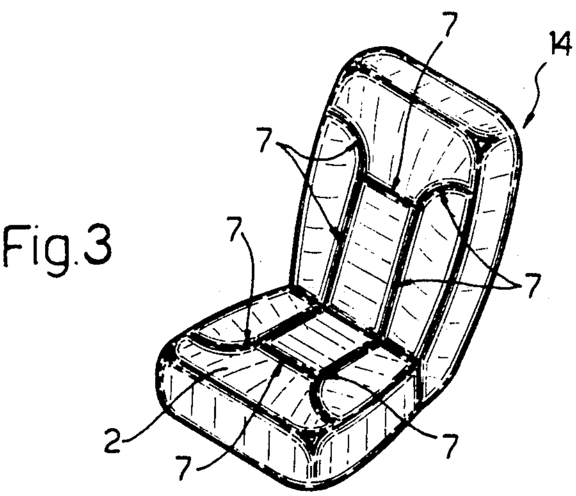

FASTENING ASSEMBLY FOR VEHICLE SEAT UPHOLSTERY

BACKGROUND OF THE INVENTION

The present invention relates to a vehicle seat upholstering assembly, in particular, for fastening upholstery to the seat padding.

The standard practice for securing upholstery to the padding on vehicle seats is by means of assemblies consisting of pairs of bars or rods, of which one is sunk inside the padding and the other housed inside a tubular fabric sheath integral with (e.g. stitched to) the upholstery; which bars or rods are connected together by means of a number of metal fasteners. The said rods are usually of steel and straight in shape, to enable insertion inside the said sheath.

The portions whereby the upholstery is secured to the padding, which are usually in the form of visible stitching defining and separating loosely padded portions of the upholstery, form the pattern characterising the design of the seat.

Using known fastening assemblies, the said portions cannot be other than straight, in order to match the underlying rods, which fact poses serious limitations in terms of seat pattern design.

SUMMARY OF THE INVENTION

The aim of the present invention is to provide a fastening assembly for securing upholstery to the padding of a vehicle seat and designed to overcome the aforementioned drawback typical of known fastening assemblies of the aforementioned type.

With this aim in view, according to the present invention, there is provided a fastening assembly for securing upholstery to the padding of a vehicle seat, which assembly comprises a first element integral with the said padding; a second element securable to the said upholstery; and means for connecting the said first and second elements; characterised by the fact that the said second element is a flexible section haing a portion designed for direct fitment to the said upholstery.

BRIEF DESCRIPTION OF THE DRAWINGS

A preferred embodiment of the present invention will be described with reference to the accompanying drawings, in which:

FIG. 1 shows a section of a fastening assembly for securing upholstery to the padding of a vehicle seat, in accordance with the teachings of the present invention;

FIG. 2 shows a view in perspective of an element on the FIG. 1 assembly prior to fastening;

FIG. 3 shows a schematic view of a vehicle seat featuring the fastening assembly according to the present invention.

DETAILED DESCRIPTION OF THE INVENTION

Number 1 in FIG. 1 indicates a fastening assembly for securing upholstery 2 to the padding 3 of a vehicle seat. Assembly 1 comprises a round-section bar 4 conveniently formed of steel, which is housed inside a recess 5 in padding 3, and portions of which are sunk inside the said padding 3. Bar 4 and respective recess 5 may be curved as required.

Assembly 1 also comprises a flexible section 6 preferably formed of plastic, curved so as to match bar 4, and secured, e.g. stitched, to a thinner portion 7 of upholstery 2.

As shown clearly in FIG. 2, section 6 presents an initial elongated-straight-section rib 8 having a number of equally-spaced longitudinal slots 9 aligned in the vicinity of a longitudinal edge 11 substantially in the form of a cylindrical projection and which provides for strengthening.

When upholstering the said seat, edge 10 of section 6, opposite the said edge 11, is bent, conveniently by applying heat, into a tab 10 integral with and perpendicular to rib 8 (FIG. 1). In actual use, the said tab 10 is stitched to upholstery 2, as shown schematically by stitches 16 in FIG. 1.

Section 6 and bar 4 are brought together, so that section 6 is also housed inside recess 5, and connected together by means of a number of substantially C-shaped metal fasteners 12, which engage a respective slot 9 on section 6, and the opposite ends 13 of which surround the said edge 11 and bar 4. The grip of fasteners 12 is such as to bring together section 6 and bar 4 and so bring upholstery 2 into contact with padding 3.

FIG. 3 shows an example of fastening assembly 1 according to the present invention applied to a vehicle seat 14, on which the straight and curved fastening portions 7 are clearly visible.

The advantages of fastening assembly 1 according to the present invention will be clear from the foregoing description. Firstly, flexible section 6 provides for an infinite variety of patterns, unlike known systems which are limited to straight lines. Secondly, in addition to being secured using metal fasteners, in exactly the same way as traditional rods, the said section may be stitched directly to upholstery 2, thus eliminating not only the rod but also the respective fabric sheath. Finally, the said section 6 may be employed on any type of seat, and for upholstery of any type or design, with obvious advantages in terms of scale economy.

To those skilled in the art it will be clear that changes may be made to assembly 1 as described and illustrated herein without, however, departing from the scope of the present invention. For example, changes may be made to the shape of section 6, and to the manner in which it is secured to both upholstery 3 (e.g. electrowelded) and to bar 4.

We claim:

1. A fastening assembly for securing upholstery to the padding of a seat, comprising:
   (a) first element for being integral with a padding member of the seat;
   (b) a second element for securing to an upholstery member of the seat;
   (c) means for connecting said first and second elements;
   (d) said second element including a flexible section and a longitudinal strengthening projection; and
   (e) said flexible section including a tab portion for direct attachment to said upholstery member and a rib portion having a plurality of openings for securing said flexible section to said first element;
   (f) wherein said tab portion is bent so as to be attached to said upholstery member.

2. The fastening assembly of claim 1, wherein:
   (a) said openings are equally spaced oblong shaped slots.

3. The fastening assembly of claim 1, wherein:
   (a) said first element including a bar shaped member for housing in a recess in said padding member.

4. The fastening assembly of claim 3, wherein:

(a) said connecting means comprising a fastener.

5. The fastening assembly of claim 4, wherein:

(a) said fastener is generally C-shaped and one end of which is received in one of said openings and another end thereof is secured to said bar shaped member.

6. The fastening assembly of claim 1, wherein:

(a) said second element is made of a plastic material.

7. The fastening assembly of claim 1, wherein:

(a) upon securing said upholstery to said padding member said tab and rib portions extend generally perpendicular to each other.

* * * * *